(12) United States Patent
Kim et al.

(10) Patent No.: US 12,421,773 B2
(45) Date of Patent: Sep. 23, 2025

(54) DOOR LATCH DEVICE FOR VEHICLES

(71) Applicants: Hyundai Motor Company, Seoul (KR); Kia Corporation, Seoul (KR); Pyeong Hwa Automotive Co., Ltd., Daegu (KR)

(72) Inventors: Hyong Don Kim, Yongin-si (KR); Jinwoo Nam, Seoul (KR); Dong Hee Ma, Hwaseong-si (KR); Hyeon Tae Park, Yeongcheon-si (KR); Hyuk Noh, Daegu (KR); Hyun Duk Cho, Daegu (KR)

(73) Assignees: Hyundai Motor Company, Seoul (KR); Kia Corporation, Seoul (KR); Pyeong Hwa Automotive Co., Ltd., Daegu (KR)

( * ) Notice: Subject to any disclaimer, the term of this patent is extended or adjusted under 35 U.S.C. 154(b) by 188 days.

(21) Appl. No.: 17/964,614

(22) Filed: Oct. 12, 2022

(65) Prior Publication Data
US 2023/0203855 A1 Jun. 29, 2023

(30) Foreign Application Priority Data
Dec. 28, 2021 (KR) ........................ 10-2021-0189378

(51) Int. Cl.
*E05B 83/38* (2014.01)
*E05B 85/26* (2014.01)
*B60J 5/04* (2006.01)

(52) U.S. Cl.
CPC .............. *E05B 83/38* (2013.01); *E05B 85/26* (2013.01); *B60J 2005/0475* (2013.01)

(58) Field of Classification Search
CPC .......... E05B 83/38; E05B 85/04; E05B 85/26; E05B 15/0205; E05B 2063/0026; E05B 77/38; E05B 81/22; Y10S 292/51; Y10S 292/55; Y10S 292/72; B60J 2005/0475; Y10T 292/1082
See application file for complete search history.

(56) References Cited

U.S. PATENT DOCUMENTS

| | | | | |
|---|---|---|---|---|
| 1,108,873 | A * | 8/1914 | Methven | E05B 15/0205 292/DIG. 40 |
| 5,020,838 | A * | 6/1991 | Fukumoto | E05B 81/14 292/216 |
| 2005/0127712 | A1* | 6/2005 | Castillo | E05D 3/127 296/146.12 |
| 2006/0087126 | A1* | 4/2006 | Roussel | E05B 85/26 292/116 |
| 2018/0274272 | A1* | 9/2018 | Woo | E05B 77/46 |

FOREIGN PATENT DOCUMENTS

| | | | | |
|---|---|---|---|---|
| DE | 3221049 | A * | 12/1983 | E05B 77/38 |
| WO | WO-2010087414 | A1 * | 8/2010 | E05F 5/027 |

* cited by examiner

*Primary Examiner* — Carlos Lugo
(74) *Attorney, Agent, or Firm* — Morgan Lewis & Bockius LLP

(57) ABSTRACT

A door latch device for vehicles may configure a pop-up guide unit at a location far from a hinge portion on a door by integrally forming the pop-up guide unit in a latch unit for keeping a locking state of the door in a vehicle without a B pillar, preventing a mutual sweeping phenomenon of a door or vehicle body-side weather strip during a pop-up operation process of the door.

13 Claims, 10 Drawing Sheets

DOOR LATCH DEVICE FOR VEHICLES

CROSS-REFERENCE TO RELATED APPLICATION

The present application claims priority to Korean Patent Application No. 10-2021-0189373 filed on Dec. 28, 2021, the entire contents of which is incorporated herein for all purposes by this reference.

BACKGROUND OF THE PRESENT DISCLOSURE

Field of the Present Disclosure

The present disclosure relates to a door latch device for vehicles, and more particularly, to a door latch device for vehicles, which minimizes a mutual sweeping phenomenon of a door or vehicle body side weather strip in a pop-up operation process when a front door and a rear door are independently opened or closed by dual motions in a vehicle without a B pillar.

Description of Related Art

In general, a vehicular door as a door for distinguishing the inside and the outside of a vehicle plays an important function of blocking external noise, rain, dust, wind, etc., and safely protecting a passenger by absorbing a shock jointly with a side structure during a side collision.

There are various types of vehicular doors including a special-purpose door, but a hinge-type swing door is most frequently applied to a passenger vehicle.

In general, the swing door refers to a door opened to the outside of a vehicle body around a hinge shaft provided through a hinge bracket between the swing door and the vehicle body, and has an advantage in that the swing door is easily opened or closed, a structure is simple, and maintenance is easy.

Meanwhile, in some vehicles, an opposite-type swing door is applied in which when the door is opened, an opening feeling is large, and it is advantageous in get-on or off of a passenger.

The opposite-type swing door is divided into a type without a B pillar and a type with the B pillar.

FIG. 1 is a side view exemplarily illustrating a vehicle adopting an opposite-type swing door according to an example of the related art and FIG. 2 is a cross-sectional view exemplarily illustrating a portion where a front door and a rear door are in contact with each other in the vehicle of FIG. 1.

Referring to FIG. 1 and FIG. 2, when the opposite-type swing door applied to a vehicle without a B pillar is described, hinge shafts of a front door 110 are provided in a vehicle body 100 and a front end portion of the front door 110 and hinge shafts of a rear door 120 are provided in the vehicle body 100 and a rear end portion of the rear door 120.

In the opposite-type swing door, a latch unit LC for keeping a locking state is provided at one side of the front door 110 or the rear door 120.

Furthermore, a sealing S for airtightness is provided between the rear end portion of the front door 110 and the front end portion of the rear door 120.

Accordingly, in the case of the opposite-type swing door of the vehicle without the B pillar, an opening feeling is excellent during get-on or off of a passenger or a leisure activity, but when the front door 110 and the rear door 120 are opened or closed, there is a disadvantage in that an opening/closing order is predetermined as the front door 110 should be first opened or later closed due to an interference problem in which rotation trajectories of the front door 110 and the rear door 120 overlap.

Accordingly, there is a problem in that the opening/closing order of the front door 110 and the rear door 120 is predetermined, so that the rear door 120 cannot be opened or closed singly.

Accordingly, to resolve a problem of the opposite-type swing door in the vehicle without the B pillar, in recent years, there is a tendency that the door is opened or closed by dual motions including the pop-up operation and the swing operation through the hinge portion.

FIG. 3 is a plan view for describing door opening and closing motions by dual motions of the opposite-type swing door according to an example of the related art.

Referring to FIG. 3, a vehicle 100 includes the front door 110 in front of the vehicle and the rear door 120 in the rear of the vehicle, and for convenience of understanding, the dual motions will be described through an example of applying a hinge portion 130 implementing the dual motions to the rear door 120

Step (S1) of FIG. 3 represents a closed state of the rear door 120, step (S2) of FIG. 3 represents the pop-up operation in which the hinge portion 130 of the rear door 120 moves to the outside of the rear of the vehicle body 100 by sliding, step (S3) of FIG. 3 represents a conversion operation to the swing operation after the pop-up operation of the rear door 120 is completed, and step (S4) of FIG. 3 represents a state in which the rear door 120 is fully opened.

During the dual motion operation process of the rear door 120, as in step (S2) of FIG. 3, during the pop-up operation, to stably separate the rear door 120 from the front door 110, a pop-up guide unit is provided at the front side of the rear door 120, and only when the pop-up guide unit should be provided at the front of the rear door 120 as possible, a parting part of the rear door 120 is not leaned to a weather strip of the vehicle body 100, and as a result, the rear door 120 is opened while a sweeping phenomenon does not occur.

However, as illustrated in FIG. 1, the latch unit LC for keeping the locking state of the door is already provided at a lower side of a frontmost side, so there is a disadvantage in that it is difficult to install the pop-up guide unit at the lower portion of the frontmost side of the rear door in which an installation space is insufficient.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a door latch device for vehicles, which configures a pop-up guide unit at a location far from a hinge portion on a door as possible by integrally forming the pop-up guide unit in a latch unit for keeping a locking state of the door in a vehicle without a B pillar to prevent a mutual sweeping phenomenon of a door or vehicle body-side weather strip during a pop-up operation process of the door.

Various aspects of the present disclosure are directed to providing a door latch device for vehicles, which includes: a striker fixed to a vehicle body to correspond to one side of a lower portion of a door of the vehicle opened or closed by dual motions of a pop-up operation and a swing operation through a hinge portion; a latch unit provided at one side of the lower portion of the door and restraining or releasing the striker through a claw lever and a pawl lever on a body; and a pop-up unit in which a guide groove is formed and integrally formed at a first side of the body of the latch unit at a predetermined angle to guide one side of the lower portion of the door by the striker during the pop-up operation.

The pop-up guide unit may include a first guider integrally formed at a first side of the body, and a second guider including the guide groove including a predetermined gap between the second guider and the first guider, and integrally formed at a second side of the body.

In the guide groove, a gap of an inlet portion between the first guider and the second guider may be formed to be greater than a predetermined gap of the guide groove.

The first guider may be formed to be longer than the second guider.

A predetermined angle of the guide groove may be greater than an angle of a reference line by use of an extension line connecting a rotation center of the hinge portion and a restraining point of the striker as the reference line, and set in a smaller angle range than a pop-up angle of the hinge portion, while the door is closed.

Here, the predetermined angle of the guide groove may be greater than the angle of the reference line by 10 degrees or more than 10 degrees by use of the extension line connecting the rotation center of the hinge portion and the restraining point of the striker as the reference line, and set in a smaller angle range than the pop-up angle of the hinge portion by 10 degrees or more than 10 degrees, while the door is closed.

Furthermore, the predetermined angle of the guide groove may be set to an angle of the guide groove at a time when one point on the door separated from the hinge portion by a maximum distance for each distance between the hinge portion and the pop-up guide unit moves to the outside of the vehicle during the pop-up operation of the door according to the pop-up angle of the hinge portion.

The latch unit may include a body fixed to one side of the lower portion of the door, a claw lever in which a restraining groove restraining the striker is formed at a first side of the claw lever and a latching end portion for limiting unidirectional rotation of the claw lever is formed at a second side of the claw lever, and which is rotatably pin-coupled to the body to correspond to the inside of the guide groove of the pop-up guide unit, a pawl lever in which a support end portion acting on the latching end portion is formed at a first side of the pawl lever and a release end portion which protrudes is formed at a second side of the pawl lever, and a protruding end portion which protrudes at an opposite side to the support end portion and the release end portion and suppresses the unidirectional rotation is formed, and which is rotatably pin-coupled to the body to correspond to one side of the claw lever, and an operation lever in which an operation end portion acting on the release end portion of the pawl lever is formed at a first side of the operation lever and a connection end portion connected to a handle wire is formed to a second side of the operation lever, and which is rotatably pin-coupled onto a connection bracket fixed to the lower portion of the body.

The latch unit may further include a claw damper provided at a first side of the body to suppress rotation of the claw lever by supporting one surface of the claw lever, and a pawl damper provided at a second side of the body to support rotation of the pawl lever by supporting a surface of the pawl lever.

The latch unit may further include a claw spring engaged in a pin of the claw lever and elastically supporting the claw lever in a direction to restrain and release the striker at the lower portion of the body, and a pawl spring engaged in a pin of the pawl lever and elastically supporting the pawl lever in a direction to support the latching end portion of the claw lever by the support end portion of the pawl lever.

One side of the lower portion of the door may be one side of the front of the lower portion of the rear door.

The striker may be formed in a "C" shape to insert the second guider of the pop-up guide unit and provided in the vehicle body through a bracket.

According to exemplary embodiments of the present disclosure, a pop-up guide unit in which a guide groove of a predetermined angle is formed between first and second guiders is integrally formed on a latch unit for keeping a locking state of a door in a vehicle without a B pillar to reduce the number of parts and resolve an insufficient installation space problem of the pop-up guide unit at a front of a lower portion of the door where the latch unit is installed.

Furthermore, the pop-up guide unit may be configured at a location far from a hinge portion on the door as possible by integrally forming the pop-up guide unit in the latch unit and a predetermined angle of a guide groove formed in the pop-up guide unit is ideally set to prevent a door parting portion farthest from the hinge portion from being leaned to the interior of a vehicle body, preventing a mutual sweeping phenomenon of a door or vehicle body-side weather strip during a pop-up operation process of the door.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
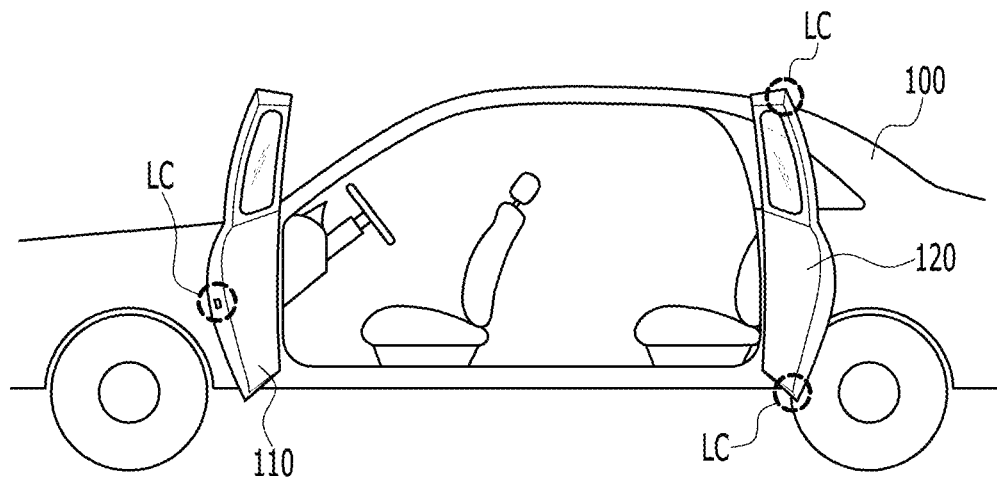
FIG. 1 is a side view exemplarily illustrating a vehicle adopting an opposite-type swing door according to an example of the related art.
Figure 2:
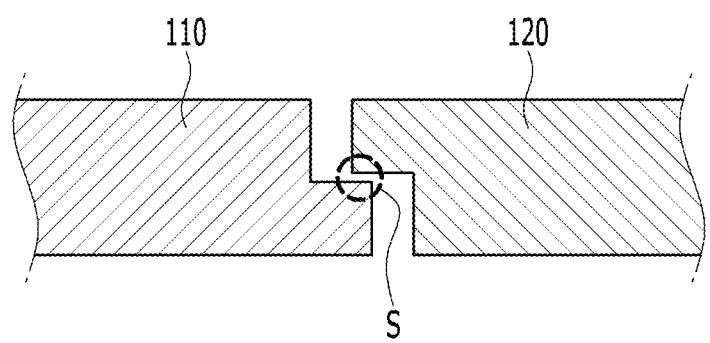
FIG. 2 is a cross-sectional view exemplarily illustrating a portion where a front door and a rear door are in contact with each other in the vehicle of FIG. 1.
Figure 3:
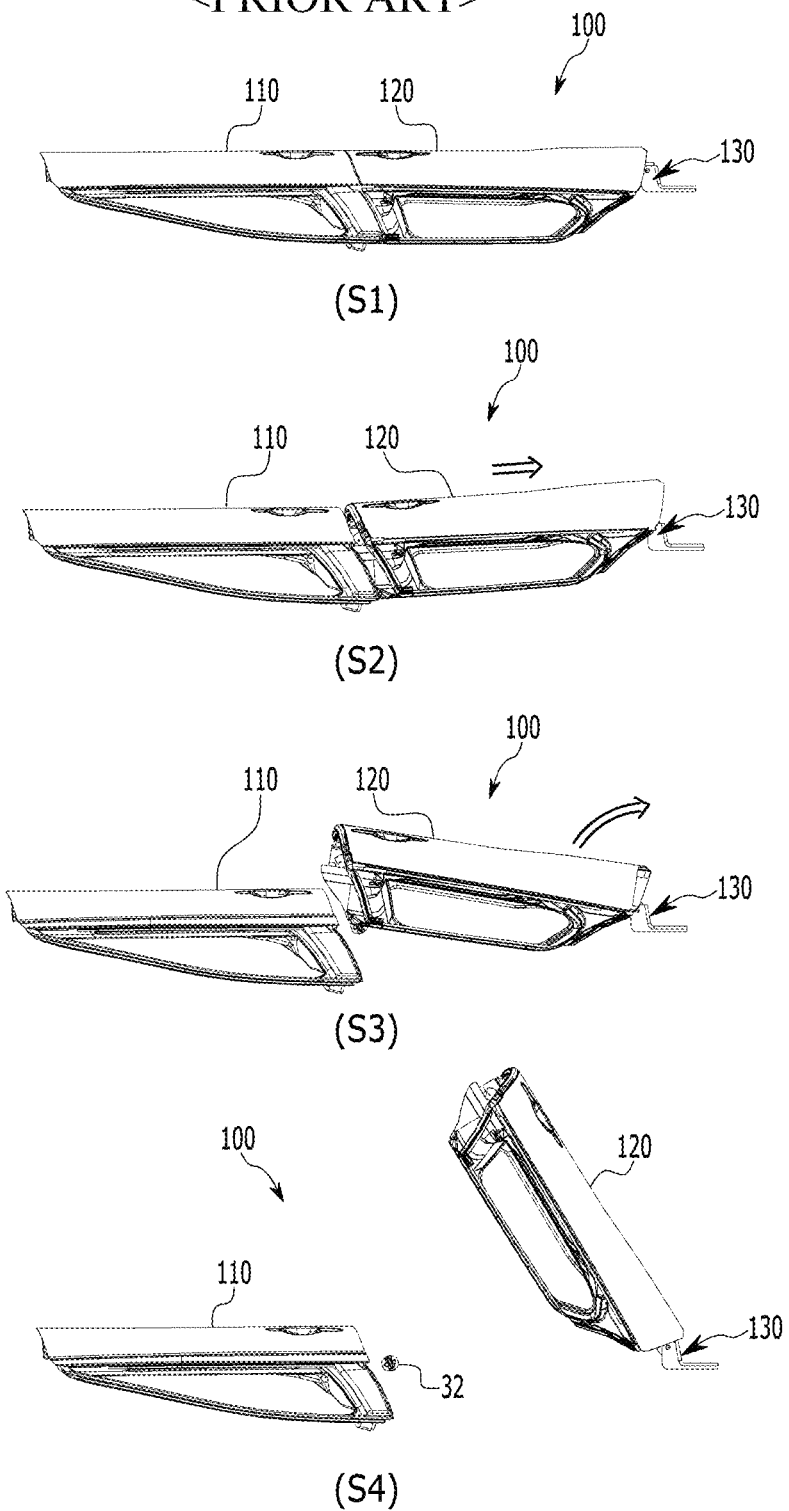
FIG. 3 is a plan view for describing door opening and closing motions by dual motions of the opposite-type swing door according to an example of the related art.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a various exemplary embodiments of the present disclosure will be described in detail with reference to the accompanying drawings.

However, since size and thickness of each component illustrated in the drawings are arbitrarily represented for convenience in explanation, the present disclosure is not particularly limited to the illustrated size and thickness of each component and the thickness is enlarged or reduced, and illustrated in order to clearly express various parts and areas. Furthermore, in order to clearly describe the exemplary embodiment of the present disclosure, parts not related to the description are omitted.

Figure 4:
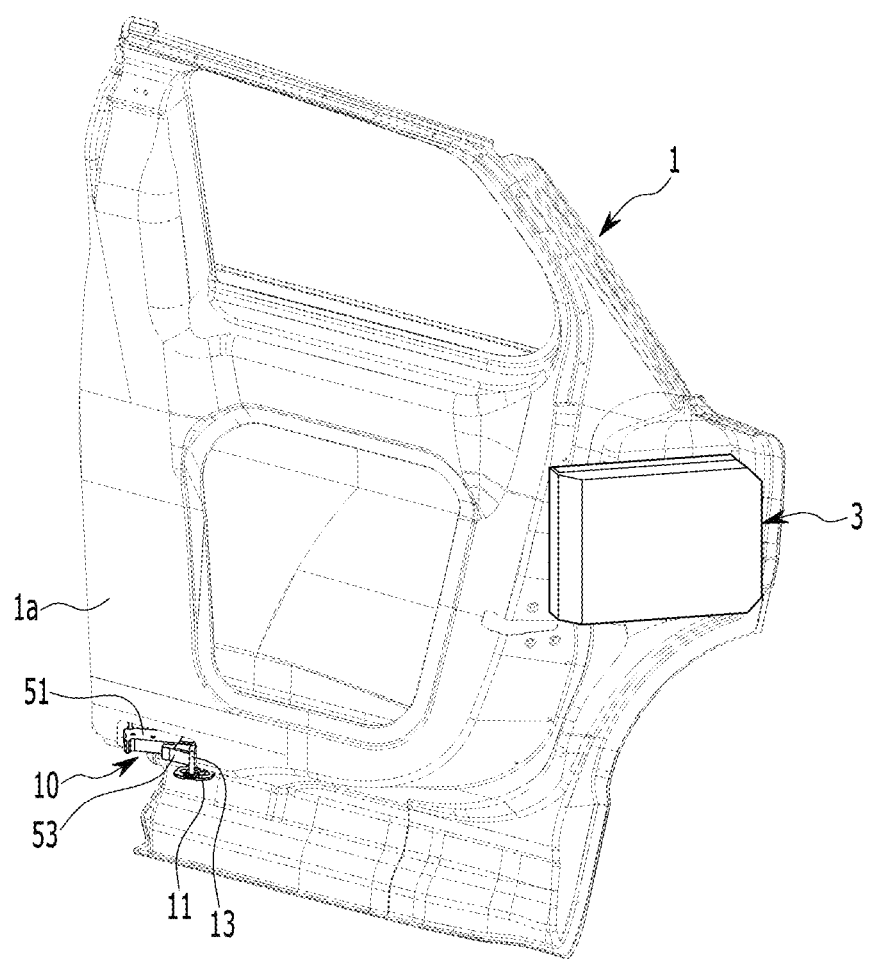
FIG. 4 is an internal perspective view of a rear door adopting a door latch device for vehicles according to various exemplary embodiments of the present disclosure.

In describing the exemplary embodiment of the present disclosure, for convenience of description, the exemplary embodiment of the present disclosure is described by defining a left side of FIG. 4 as a front and a right side as a rear. Furthermore, a door latch device for vehicles according to various exemplary embodiments of the present disclosure is provided in both rear doors in the rear of a driver seat and a passenger seat of a vehicle, and an example in which the door latch device is applied to the rear door in the rear of the passenger seat is described in the exemplary embodiment of the present disclosure.

Figure 5:
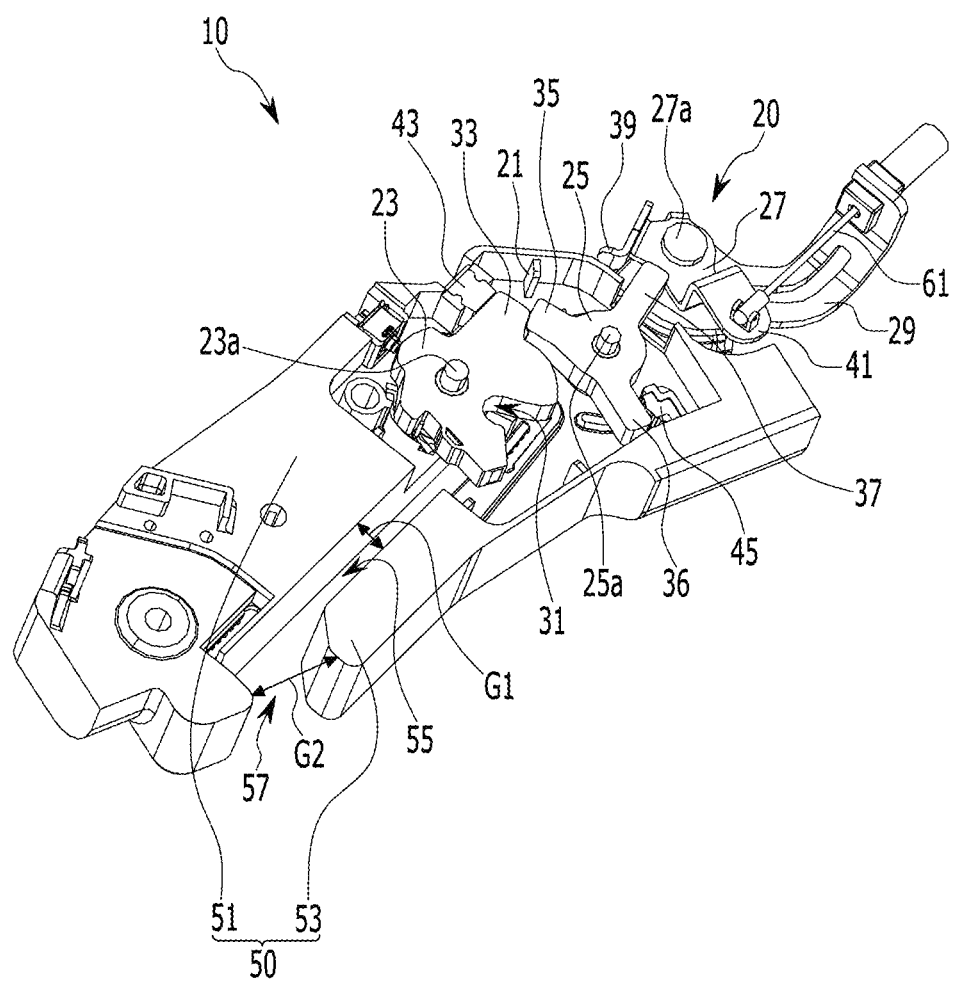
FIG. 5 is an upper perspective view of the door latch device for vehicles according to the exemplary embodiment of the present disclosure.
Figure 6:
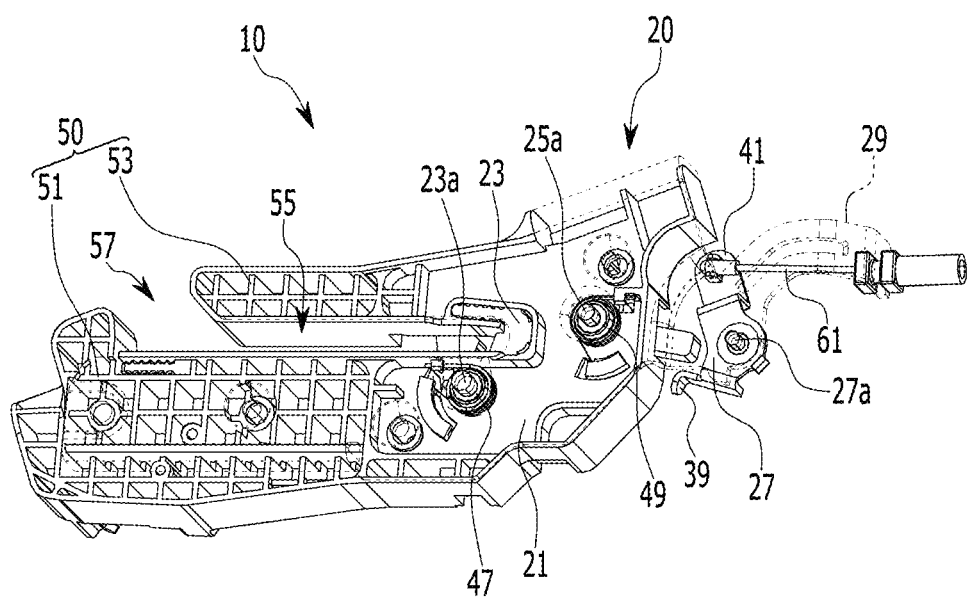
FIG. 6 is a lower perspective view of the door latch device for vehicles according to the exemplary embodiment of the present disclosure.

FIG. 4 is an internal perspective view of a rear door adopting a door latch device for vehicles according to various exemplary embodiments of the present disclosure, FIG. 5 is an upper perspective view of the door latch device for vehicles according to the exemplary embodiment of the present disclosure, and FIG. 6 is a lower perspective view of the door latch device for vehicles according to the exemplary embodiment of the present disclosure.

The door latch device 10 for vehicles according to the exemplary embodiment of the present disclosure may be applied to a rear door 1 of a passenger vehicle without a B pillar. That is, the door latch device 10 for vehicles is configured between one lower side of the rear door 1 which is opened and opened by dual motions of a pop-up operation and a swing operation through a hinge portion 3 and a vehicle body corresponding thereto.

Referring to FIG. 4, FIG. 5 and FIG. 6, the door latch device 10 for vehicles according to the exemplary embodiment of the present disclosure may include a striker 11, a latch unit 20, and a pop-up guide unit 50.

The striker 11 is fixed to the vehicle body to correspond to one side of the front of the lower portion of the rear door 1 which is opened and opened by the dual motions of the pop-up operation and the swing operation through the hinge portion 3.

The latch unit 20 is configured at one side of the lower portion of the rear door 1 to perform a function to keep a closed state of the rear door 1 or open the rear door 1 by restraining or releasing the striker 11 through a claw lever 23 and a pawl lever 25 on a body 21.

The latch unit 20 includes the body 21, the claw lever 23, the pawl lever 25, and an operation lever 27.

That is, a cut portion is formed at one side of the front of the lower portion of an internal panel 1a of the rear door 1 and the latch unit 20 is provided inside the cut portion to be configured to act on the striker 11 on the vehicle body.

The body 21 is fixed to the inside of the cut portion at one side of the front of the lower portion of the rear door 1, and a connection bracket 29 is assembled to a lower portion of the body 21.

The claw lever 23 is rotatably provided in the body 21 through a first pin 23a to correspond to the pop-up guide unit 50.

Furthermore, in the claw lever 23, a restraining groove 31 restraining the striker 11 is formed at one side and a latching end portion 33 for limiting unidirectional rotation is formed to protrude at the other side thereof.

The pawl lever 25 is rotatably provided in the body 21 through a second pin 25a to correspond to one side of the claw lever 23.

Furthermore, in the pawl lever 25, a support end portion 35 which acts on the latching end portion 33 is formed at one side and a release end portion 37 is formed to protrude on the other side thereof.

Furthermore, in the pawl lever 2, a protruding end portion 36 which protrudes at an opposite side to the support end portion 35 and the release end portion 37 to suppress the unidirectional rotation of the pawl lever 25 is formed.

The operation lever 27 is rotatably provided on a connection bracket 29 fixed to the lower portion of the body 21 through a third pin 27a.

Furthermore, in the operation lever 27, an operation end portion 39 which acts on the release end portion 37 of the pawl lever 25 is formed at one side and a connection end portion 41 connected to a handle wire 61 is formed at the other side thereof.

Furthermore, the latch unit 20 further includes a claw damper 43, a pawl damper 45, a claw spring 47, and a pawl spring 49.

The claw damper 43 is provided at one side of the body 21 to correspond to one surface of the latching end portion 33, and supports one surface of the latching end portion 33 of the claw lever 23 to reduce contact noise while suppressing the unidirectional rotation.

The pawl damper 45 is provided at the other side of the body 21 to correspond to one surface of the protruding end portion 36 of the pawl lever 25, and supports the protruding end portion 36 of the pawl ever 25 to reduce the contact noise while suppressing the unidirectional rotation.

The claw spring 47 is engaged in the first pin 23a of the claw lever 23 at a lower portion of the body 21 and provided to elastically support the claw lever 23 in a direct to release the restraint of the striker 11.

The pawl spring 49 is engaged in the second pin 25a of the pawl lever 25 at a lower portion of the body 21 and provided to elastically support the pawl lever 23 in a direct for the support end portion 35 of the pawl lever 25 to support the latching end portion 33 of the claw lever 23.

Furthermore, the pop-up guide unit 50 is formed integrally at one side of the front of the body 21 of the latch unit 20 to guide one side of the front of the lower portion of the rear door 1 by the striker during the pop-up operation of the rear door 1.

That is, in the pop-up guide unit 50, a first guider 51 is formed integrally at one side of the front of the body 21, and a second guider 53 is formed integrally at the other side of the body 21 while guide grooves 55 including a predetermined gap G1 are formed between the second guider 53 and the first guider 51.

A gap G2 of an inlet portion 57 between the first guider and the second guider 51 and 53 is formed to be greater than the predetermined gap G1 of the guide groove 55 and the guide groove 55 is formed so that the striker 11 easily enters.

Here, the first guider 51 is formed to be longer than the second guider 53 and the inlet portion 57 which the striker 11 enters is configured toward the outside of the vehicle body.

Figure 7:
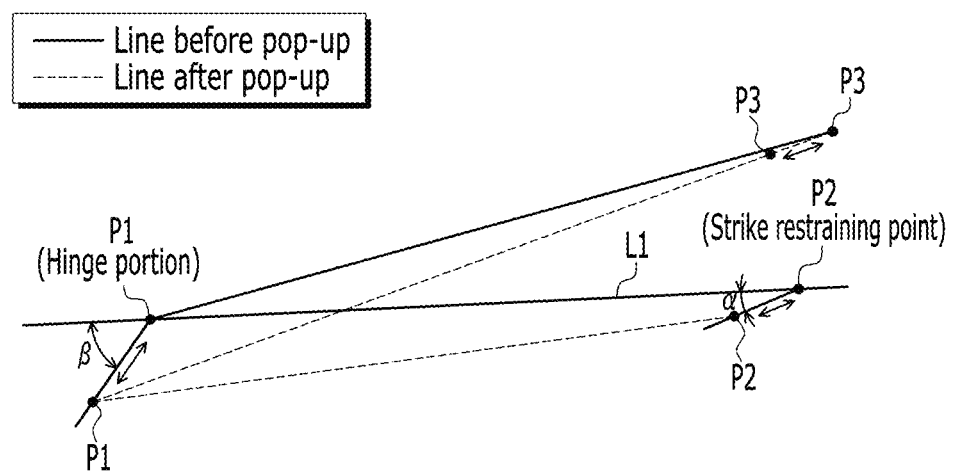
FIG. 7 is a line diagram illustrating an operation trajectory during a pop-up operation of the door adopting the door latch device for vehicles according to the exemplary embodiment of the present disclosure.

FIG. 7 is a line diagram illustrating an operation trajectory during a pop-up operation of the door adopting the door latch device for vehicles according to the exemplary embodiment of the present disclosure.

Referring to FIG. 7, the guide groove 55 has a predetermined angle a, and the predetermined angle a of the guide groove 55 is an angle formed as an acute angle by use of an extension line L1 connecting a rotation center P1 of the hinge portion 3 and a restraint point P2 of the striker 11 as a reference line while the rear door 1 is closed.

That is, when the rear door 1 performs the pop-up operation through the hinge portion 3 during the dual motion operation process, the front side of the rear door 1 is guided through the pop-up guide unit 50, and in the instant case, only when the pop-up guide unit 50 is provided at a location far from the hinge portion 3 on the rear door 1 as possible, the front parting part of the rear door 1 is not leaned to the weather strip, and as a result, a sweeping phenomenon does not occur.

Furthermore, the rear door 1 affects the operation trajectory of the front parting part of the rear door 1 even according to the predetermined angle a of the guide groove 55 formed in the pop-up guide unit 50.

That is, as the predetermined angle a of the guide groove 55 is smaller, an amount at which the front parting part of the rear door 1 is leaned to the interior of the vehicle body increases, and even though the predetermined angle a is too large, the front parting part of the rear door 1 interferes with the front door.

In the door latch device according to the exemplary embodiment of the present disclosure, the pop-up guide unit 50 is integrally formed in the latch unit 30 and the location is set to adjust the predetermined angle a of the guide groove 55.

In the present purpose, if the angle of the extension line L1 is 0 degree, the predetermined angle a of the guide groove 55 formed in the pop-up guide unit 50 may be greater than the angle of the extension line L1, and set in a smaller angle range than a pop-up angle β of the hinge portion 3.

That is, the predetermined angle a of the guide groove 55 may be set to the angle of the guide groove 55 at the time when the front parting part which is one point P3 on the rear door 1 separated from the hinge portion 3 by a maximum distance for each distance between the hinge portion 3 and the pop-up guide unit 50 moves to the outside of the vehicle body when the hinge portion 3 of the rear door 1 performs the pop-up operation according to the pop-up angle β of the hinge portion 3.

In general, if the angle of the extension line L1 which is the reference line is 0 degree while the rear door 1 is closed, the predetermined angle a of the guide groove 55 may be greater than the angle of the extension line L1 by 10 degrees or more than 10 degrees and set in a smaller angle range than the pop-up angle β of the hinge portion 3 by 10 degrees or more than 10 degrees.

Meanwhile, the striker 11 may be formed as a "C" shape rod so that the second guider 53 of the pop-up guide unit 50 is inserted, and provided in the vehicle body 5 (see FIG. 8) through a bracket 13.

In the exemplary embodiment of the present disclosure, an example in which the striker 11 is formed in the "C" shape rod is illustrated, but the present disclosure is not limited thereto, and the striker 11 may be formed in a straight rod shape.

Hereinafter, the operation for each step of the door latch device for vehicles according to the exemplary embodiment of the present disclosure will be described with reference to FIG. 8, FIG. 9 and FIG. 10.

Figure 8:
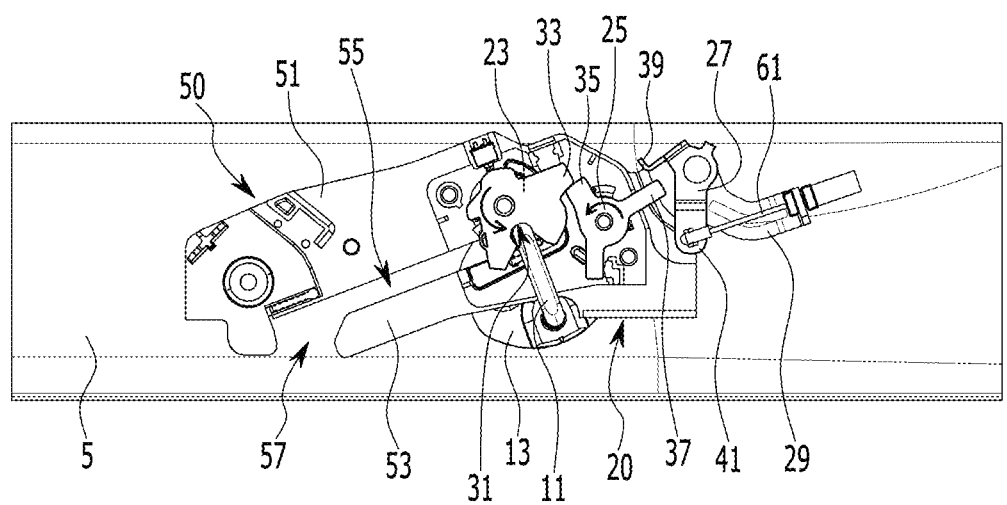
FIG. 8, FIG. 9 and FIG. 10 are plan views exemplarily illustrating an operation state for each step of the door latch device for vehicles according to the exemplary embodiment of the present disclosure.
Figure 9:
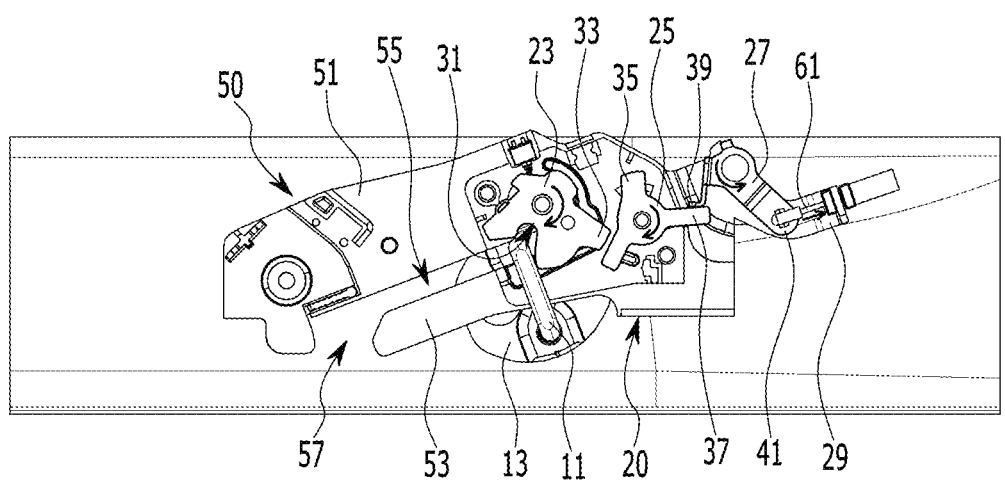
Figure 10:
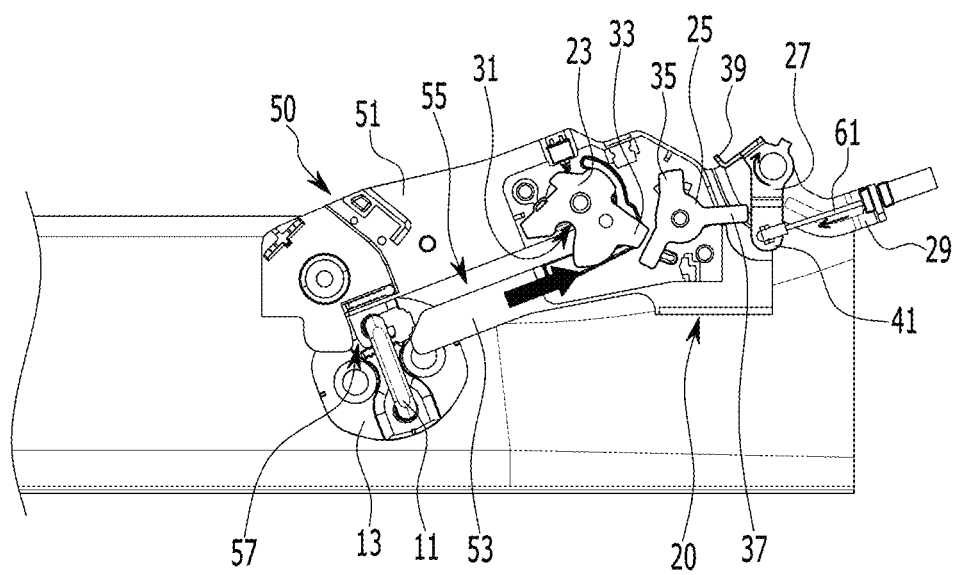

FIG. 8, FIG. 9 and FIG. 10 are plan views exemplarily illustrating an operation state for each step of the door latch device for vehicles according to the exemplary embodiment of the present disclosure.

First, referring to FIG. 8, while the rear door 1 is fully closed, in the instant case, the striker 11 is engaged in the second guider 53 of the pop-up guide unit 50 and keeps a restrained state to the restraining groove 31 of the claw lever 23 on the latch unit 20.

In such a state, referring to FIG. 9, when the connection end portion 41 of the operation lever 27 is pulled through the handle wire 61, the operation end portion 39 pushes the release end portion 37 of the pawl lever 25 while the operation lever 27 rotates, and as a result, the pawl lever 25 is rotated by the pawl spring 49.

As a result, the support end portion 35 of the pawl lever 25 is separated from the latching end portion 33 of the claw lever 23 and the claw lever 23 is thus rotated by the claw spring 47.

Accordingly, the striker 11 is movable to the restraint groove 31 of the claw lever 23 along the guide groove 55 of the pop-up guide unit 50 and the pop-up operation of the rear door 1 may be achieved.

Thereafter, referring to FIG. 10, when the hinge portion 3 moves the rear end portion of the rear door 1 to the outside of the rear of the vehicle body at the pop-up angle β by the pop-up operation of the rear door 1, the pop-up guide unit 50 moves at the predetermined angle along the guide groove 55 for the strike 11 fixed to the vehicle body 5, and as a result, the front of the rear door 1 pops up.

Accordingly, when the pop-up operation of the rear door 1 is completed, the striker 11 is positioned at the inlet portion 57 of the pop-up guide unit 50 on the rear door 1 so that the swing operation of the rear door 1 is enabled, and as a result, the striker 11 may escape from the pop-up guide unit 50.

Accordingly, in the door latch device for vehicles according to the exemplary embodiment of the present disclosure, in a vehicle without a B pillar, the pop-up guide unit 50 including the guide groove 55 of the predetermined angle a between the first guider and the second guider 51 and 53 is integrally formed on the latch unit 20 for keeping the locking state of the rear door 1 to stably guide the pop-up of the front of the rear door 1 while reducing the number of parts and resolve an insufficient installation space problem of the front of the lower portion of the rear door 1 where the latch unit 20 is provided in the related art.

In the instant case, the pop-up guide unit 50 may be configured at the location far from the hinge portion 3 on the rear door 1 by integrally forming the pop-up guide unit 50 in the latch unit 20 to prevent a mutual sweeping phenomenon of a door or vehicle body-side weather strip during the pop-up operation process of the door.

Furthermore, the predetermined angle of the guide groove 55 formed in the pop-up guide unit 50 is ideally set to prevent the door parting part farthest from the hinge portion 3 from being leaned to the interior of the vehicle body, preventing interference with the front door.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A door latch apparatus for a vehicle, the door latch apparatus comprising:
   a striker fixed to a vehicle body to correspond to one side of a lower portion of a door of the vehicle, wherein the door is opened or closed by dual motions of a pop-up operation and a swing operation through a hinge portion;
   a latch unit provided at one side of the lower portion of the door and restraining or releasing the striker through a claw lever and a pawl lever on a body; and
   a pop-up unit in which a guide groove is formed and integrally formed at a first side of the body of the latch unit at a predetermined angle to guide one side of the lower portion of the door by the striker during the pop-up operation,
   wherein the pop-up guide unit includes:
      a first guider integrally formed at a first side of the body, and
      a second guider including the guide groove including a predetermined gap between the second guider and the first guider, and integrally formed at a second side of the body,
   wherein an extension line is defined from a center point of the hinge portion and a restraining point of the striker, and the hinge portion defines a pop-up angle, wherein the pop-up angle and the predetermined angle are in relation to the extension line, and
   wherein, during the pop-up operation, the door is moved toward the interior of the vehicle, so that the pop-up angle and the predetermined angle are maintained during the pop-up operation.

2. The door latch apparatus of claim 1, wherein in the guide groove, a gap of an inlet portion between the first guider and the second guider is greater than the predetermined gap of the guide groove.

3. The door latch apparatus of claim 1, wherein the first guider is formed to be longer than the second guider.

4. The door latch apparatus of claim 1, wherein the predetermined angle of the guide groove is greater than an angle of a reference line by use of the extension line connecting a rotation center of the hinge portion and the restraining point of the striker as the reference line, and set in a smaller angle range than the pop-up angle of the hinge portion, while the door is closed.

5. The door latch apparatus of claim 4, wherein the predetermined angle of the guide groove is greater than the angle of the reference line by 10 degrees or more than 10 degrees by use of the extension line connecting the rotation center of the hinge portion and the restraining point of the striker as the reference line, and set in a smaller angle range than the pop-up angle of the hinge portion by 10 degrees or more than 10 degrees, while the door is closed.

6. The door latch apparatus of claim 1, wherein the predetermined angle of the guide groove is set to an angle of the guide groove at a time when one point on the door separated from the hinge portion by a maximum distance for each distance between the hinge portion and the pop-up guide unit moves to the outside of the vehicle during the pop-up operation of the door according to the pop-up angle of the hinge portion.

7. The door latch apparatus of claim 1, wherein the latch unit includes:
   the body fixed to one side of the lower portion of the door,
   the claw lever in which a restraining groove restraining the striker is formed at a first side of the claw lever and a latching end portion for limiting unidirectional rotation of the claw lever is formed at a second side of the claw lever, and which is rotatably pin-coupled to the body to correspond to the inside of the guide groove of the pop-up guide unit;
   the pawl lever in which a support end portion acting on the latching end portion is formed at a first side of the pawl lever and a release end portion which protrudes is formed at a second side of the pawl lever, and a protruding end portion which protrudes at an opposite side to the support end portion and the release end portion and suppresses the unidirectional rotation is formed, and which is rotatably pin-coupled to the body to correspond to one side of the claw lever; and
   an operation lever in which an operation end portion acting on the release end portion of the pawl lever is formed at a first side of the operation lever and a connection end portion connected to a handle wire is formed to a second side of the operation lever, and which is rotatably pin-coupled onto a connection bracket fixed to the lower portion of the body.

8. The door latch apparatus of claim 7, wherein the latch unit further includes
   a claw damper provided at a side of the body to suppress rotation of the claw lever by supporting one surface of the claw lever.

9. The door latch apparatus of claim 7, wherein the latch unit further includes a pawl damper provided at a side of the body to support rotation of the pawl lever by supporting a surface of the pawl lever.

10. The door latch apparatus of claim 7, wherein the latch unit further includes:
- a claw spring engaged in a pin of the claw lever and elastically supporting the claw lever in a direction to restrain and release the striker at the lower portion of the body.

11. The door latch apparatus of claim 7, wherein the latch unit further includes:
- a pawl spring engaged in a pin of the pawl lever and elastically supporting the pawl lever in a direction to support the latching end portion of the claw lever by the support end portion of the pawl lever.

12. The door latch apparatus of claim 1, wherein one side of the lower portion of the door is one side of the front of the lower portion of the rear door.

13. The door latch apparatus of claim 1, wherein the striker is formed in a "C" shape to insert the second guider of the pop-up guide unit and provided in the vehicle body through a bracket.

* * * * *